US010331922B2

(12) United States Patent
Tiwari et al.

(10) Patent No.: US 10,331,922 B2
(45) Date of Patent: *Jun. 25, 2019

(54) RFID TRACKING FASTENER

(71) Applicant: Utility Composites, Inc., Round Rock, TX (US)

(72) Inventors: Rajkiran R. Tiwari, Austin, TX (US); Pamela S. Tucker, Round Rock, TX (US)

(73) Assignee: Utility Composites, Inc., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,627

(22) Filed: Dec. 15, 2017

(65) Prior Publication Data

US 2018/0196975 A1    Jul. 12, 2018

Related U.S. Application Data

(63) Continuation of application No. 15/067,290, filed on Mar. 11, 2016, now Pat. No. 9,875,382.

(51) Int. Cl.
*G06K 7/10*  (2006.01)
*G06Q 10/08* (2012.01)

(52) U.S. Cl.
CPC ..... *G06K 7/10366* (2013.01); *G06K 7/10316* (2013.01); *G06Q 10/0833* (2013.01)

(58) Field of Classification Search
CPC .............. G06K 7/10366; G06K 7/10316
(Continued)

(56) References Cited

U.S. PATENT DOCUMENTS 5,547,325 A    8/1996    Tucker et al.
5,795,121 A    8/1998    Tucker et al.
(Continued)

FOREIGN PATENT DOCUMENTS

WO    2017165898    9/2017

OTHER PUBLICATIONS

Häkli et al. "UHF RFID Based Tracking of Logs in the Forest Industry" 2010 IEEE International Conference on RFID (IEEE RFID 2010). Orlando, FL, USA, Apr. 14-16, 2010, pp. 245-251.
(Continued)

*Primary Examiner* — Vernal U Brown
(74) *Attorney, Agent, or Firm* — Meyertons, Hood, Kivlin, Kowert & Goetzel, P.C.

(57) ABSTRACT

In some embodiments, a tracking fastener may include a plastic tracking fastener. The plastic tracking fastener may include a plastic tracking staple or a plastic tracking nail. The plastic tracking fastener may include at least one elongated member comprising at least one distal end, and a proximal end. The distal end(s) may penetrate, during insertion, a surface of an object. The tracking fastener may include a wireless identification device. The wireless identification device may contain electronically stored information associated with an item to which the plastic tracking fastener is coupled. The plastic tracking fastener may have a primary antenna electrically coupled to the wireless identification device. The plastic tracking fastener may have a secondary antenna electromagnetically coupled to the primary antenna of the wireless identification device. The secondary antenna may provide higher read range/distance relative to the primary antenna itself. The tracking fastener may communicate information to an interrogator.

43 Claims, 6 Drawing Sheets

(58) Field of Classification Search
USPC .......................................................... 340/10.1
See application file for complete search history.

(56) References Cited

U.S. PATENT DOCUMENTS

| | | | | |
|---|---|---|---|---|
| 6,147,606 | A * | 11/2000 | Duan | G06K 19/0723 340/572.1 |
| 6,168,362 | B1 | 1/2001 | Tucker et al. | |
| 6,172,608 | B1 | 1/2001 | Cole | |
| 7,280,044 | B2 | 10/2007 | Kubby | |
| 7,400,247 | B2 * | 7/2008 | Hopman | G06K 19/04 340/545.2 |
| 7,581,911 | B2 | 9/2009 | Tucker et al. | |
| 8,192,571 | B2 | 6/2012 | Tucker et al. | |
| 8,448,520 | B1 * | 5/2013 | Baroudi | G01L 5/0038 73/761 |
| 8,622,298 | B2 | 1/2014 | Huber | |
| 8,878,675 | B2 | 11/2014 | Tiedmann | |
| 9,875,382 | B2 * | 1/2018 | Tiwari | G06K 7/10366 |
| 2005/0093677 | A1 * | 5/2005 | Forster | G06K 19/07749 340/10.1 |
| 2006/0103536 | A1 | 5/2006 | Kwak et al. | |
| 2006/0125653 | A1 * | 6/2006 | McQuade | B65B 11/02 340/870.07 |
| 2006/0143899 | A1 * | 7/2006 | Tuttle | G01S 13/767 29/600 |
| 2006/0145860 | A1 | 7/2006 | Brown et al. | |
| 2007/0007661 | A1 | 1/2007 | Burgess et al. | |
| 2007/0290859 | A1 * | 12/2007 | Held | G06K 7/10178 340/572.7 |
| 2008/0036673 | A1 | 2/2008 | Yamagajo et al. | |
| 2008/0048863 | A1 | 2/2008 | Copeland | |
| 2008/0243135 | A1 | 10/2008 | Robinson | |
| 2011/0315777 | A1 | 12/2011 | Hakli et al. | |
| 2012/0249302 | A1 | 10/2012 | Szu | |
| 2014/0008443 | A1 | 1/2014 | Chang et al. | |
| 2014/0067313 | A1 | 3/2014 | Breed | |
| 2015/0170018 | A1 | 6/2015 | Loussert et al. | |
| 2015/0310323 | A1 * | 10/2015 | Foster | A01F 15/08 56/341 |

OTHER PUBLICATIONS http://www.americansignumat.com/Arbo-Tag---Urban-Forest-Line.html first observed Jul. 2015.

Non-Final Office Action for U.S. Appl. No. 15/067,290 dated May 15, 2017.

Notice of Allowance for U.S. Appl. No. 15/067,290 dated Sep. 28, 2017.

International Search Report and Written Opinion for PCT/US2017/030771 dated Sep. 13, 2017.

* cited by examiner

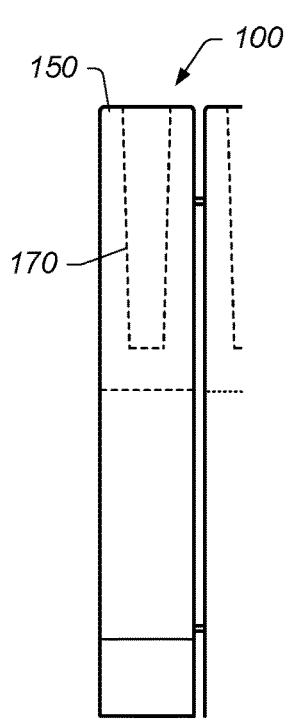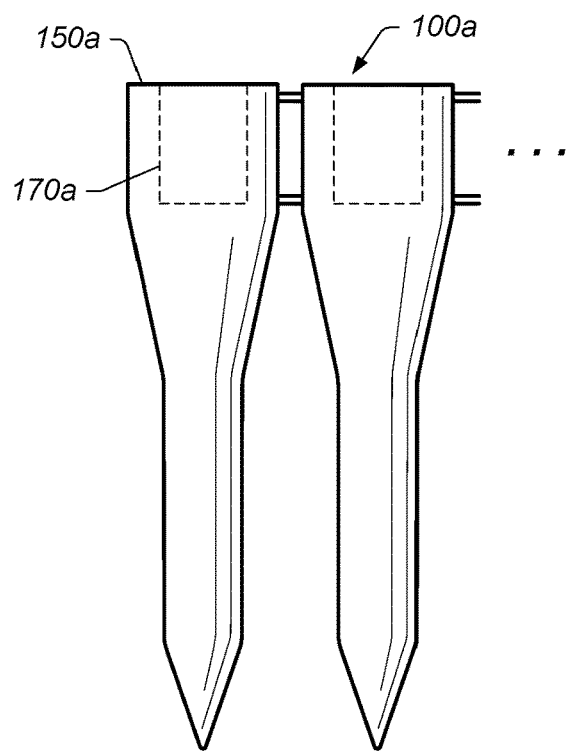
FIG. 3A    FIG. 3B
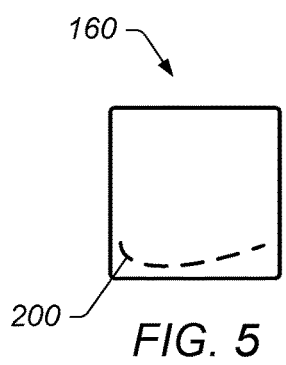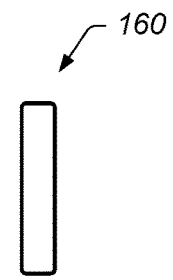
FIG. 5    FIG. 6
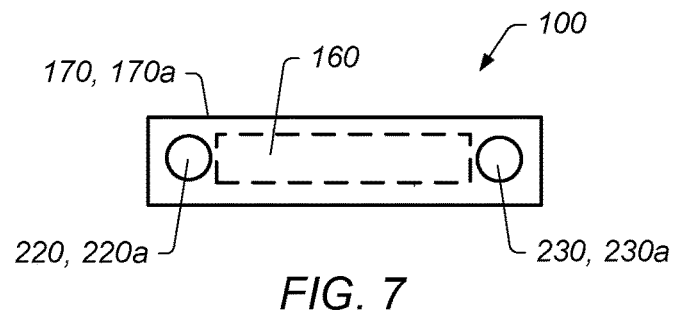
FIG. 7

RFID TRACKING FASTENER

PRIORITY CLAIM

This application is a continuation of U.S. patent application Ser. No. 15/067,290 entitled "RFID TRACKING FASTENER" filed on Mar. 11, 2016, all of which is incorporated by reference herein.

BACKGROUND OF THE INVENTION

1. Field of the Invention

The present disclosure generally relates to tracking fasteners. More particularly, the disclosure generally relates to systems and methods for tracking items using plastic tracking fasteners with radio frequency identification (RFID) tags incorporated into the plastic tracking fastener.

2. Description of the Relevant Art

Shipping of freight across distances is carried out daily throughout the world. One of the greatest challenges associated with shipping freight, no matter the distance, is tracking the freight during shipping. Goods shipped by freight in high numbers are increasingly transported in containers, on pallets or ULDs (unit load devices) in transport vehicles. Methods of tracking freight include tagging the freight directly or tagging the pallet or crate, which carries the freight. Freight must be tracked to ensure that goods are not misplaced during shipping and reach their predetermined destination.

One example of freight which requires tracking includes cut trees in the logging industry. In the logging industry cut trees may need to be tracked during transport and/or tracked as regards inventory purposes. Most applications that need RFID typically use an adhesive tag or a tag that can be attached on a card, for example, to clothing. However, there are instances where a card tag or adhesive tag cannot be easily attached to the substrate using conventional methods. For example, common RFID tags will not stick onto rough lumber. Many RFID tags use low frequency (LF) and the antenna is very tiny so the read range is maybe an inch or two. RFID tags that use high frequency (HF) have read ranges from ½" to about 36". Ultra high frequency (UHF) may be employed in RFID tracking which allows for a longer read range (5 feet to 40 feet).

Therefore an RFID system and/or method capable of long read range, for tracking of goods during transport and/or for inventory control, and which may more easily couple to rough surfaces (e.g., wood), would be highly desirable.

SUMMARY

In some embodiments, a tracking fastener may include a non-metal tracking fastener. Metal interferes with the electromagnetic energy and readability of tags. In some embodiments, the tracking fastener may include a thermoplastic material and/or a thermoset material. The tracking fastener may include at least one elongated member containing a distal end. The distal end may penetrate, during insertion, a surface of an object, and is firmly held in place on the object to be tracked. The elongated member(s) may include a proximal end. The tracking fastener may include a wireless identification device. The wireless identification device may be at least partially positioned in the proximal end of the plastic tracking fastener. The wireless identification device may contain electronically stored information associated with an object to which the plastic tracking fastener is coupled. The tracking fastener may include a primary antenna that is electrically coupled to the wireless identification device. The tracking fastener may include a secondary antenna that is electromagnetically coupled to the primary antenna.

In some embodiments, at least one distal end of the elongated member may penetrate a surface of an object during insertion.

In some embodiments, the distal end(s) of the elongated member may comprise a sharpened or pointed end that may penetrate the surface of an object during insertion. In some embodiments, the distal end(s) of the elongated member may not comprise a sharpened or pointed end that may still penetrate the surface of an object during insertion.

In some embodiments, the proximal end may penetrate, at least partially, a surface of an object such that at least part of the wireless identification device is below the surface of the object.

In some embodiments, the wireless identification device may include an RFID device. In some embodiments, the wireless identification device may include an UHF RFID device.

In some embodiments, the tracking fastener may include a primary antenna at least partially positioned in the proximal end of the plastic tracking fastener. The primary antenna may be electrically coupled to the wireless identification device.

In some embodiments, the tracking fastener may include a secondary antenna at least partially positioned in the proximal end of the plastic tracking fastener. In some embodiments, the secondary antenna may include a dipole antenna. In some embodiments, the secondary antenna may include a monopole antenna. The secondary antenna may be electromagnetically coupled to the primary antenna. In some embodiments, the secondary antenna comprises a length that is optimized for read range for a desired frequency or frequency range. At least a portion of the secondary antenna may be positioned in proximity to the primary antenna. The secondary antenna may include first and second ends extending out of the proximal end of the plastic tracking fastener for a dipole antenna or a single end extending out of the proximal end of the plastic tracking fastener for a monopole antenna.

In some embodiments, the secondary antenna may include a monopole antenna or a dipole antenna based on the application. In some embodiments, the secondary antenna may include a dipole antenna and may be preferred over monopole antenna. In some embodiments, the secondary antenna may include a monopole antenna that may be preferred over dipole antenna.

In some embodiments, the secondary antenna is electromagnetically coupled, during use, to an interrogator using an interrogator antenna. The interrogator antenna may facilitate transfer of electromagnetic energy to activate the tag. The tag may transfer stored information back to the interrogator. The interrogator may then transfer data received from tags, such as tag identification, tracking and inventory details, to a receiver (e.g., a server, a computer, etc. on which appropriate software may be run) for further processing.

In some embodiments, a system may include a supplementary antenna. The supplementary antenna may enhance transfer of electromagnetic energy between the interrogator and the wireless identification device. The supplementary antenna may function as an additional antenna for the interrogator with, for example, a higher gain (other than interrogator antenna itself).

In some embodiments, the tracking fastener may be configured for insertion using a specially designed fastener insertion machine. For example, the tracking fastener may include a tracking staple configured for insertion using a staple insertion machine, or a tracking nail configured for insertion using a nail insertion machine.

In some embodiments, the tracking fastener may be configured singly, without collation in packs, for insertion using a hammer or similar tool.

In some embodiments, the plastic tracking fastener may include a thermoset material. In some embodiments, the plastic tracking fastener may include a thermoplastic material. In some embodiments, the plastic tracking fastener may include thermoplastic and thermoset materials.

In some embodiments, a method may include tracking an object using a tracking fastener. The method may include driving at least a portion of a plastic tracking fastener into a surface of an object. The tracking fastener may include at least one elongated member including at least one distal end which penetrates a surface of an object during insertion. The elongated member(s) may include a proximal end. The method may include tracking the object using a wireless identification device, electrically coupled primary antenna, and secondary antenna electromagnetically coupled to the primary antenna which are all at least partially positioned in the proximal end of the plastic tracking fastener. The wireless identification device may contain electronically stored information associated with the object to which the plastic tracking fastener is coupled.

In some embodiments, the plastic tracking fastener may include a secondary antenna at least partially positioned in the proximal end of the plastic tracking fastener and electromagnetically coupled to the primary antenna of the wireless identification device. The secondary antenna may include a dipole antenna wherein first and second ends of the secondary antenna extend out externally from the tracking fastener. The secondary antenna may include a length that is optimized for read range for a particular frequency or frequency range.

In some embodiments, the plastic tracking fastener may include a secondary antenna at least partially positioned in the proximal end of the plastic tracking fastener and electromagnetically coupled to the primary antenna of the wireless identification device. The secondary antenna may include a monopole antenna wherein one end of the secondary antenna extends out externally from the tracking fastener. The secondary antenna may include a length that is optimized for read range at a particular frequency or frequency range.

In some embodiments, the method may include positioning a secondary antenna in close proximity to the primary antenna of the wireless identification device. The secondary antenna may enhance transfer of power between an interrogator and the primary antenna of the wireless identification device.

In some embodiments, the method may include positioning a supplementary antenna for the interrogator. The supplementary antenna may enhance transfer of electromagnetic energy between the interrogator and the wireless identification device. The supplementary antenna may function as an additional antenna for the interrogator with, for example, a higher gain (compared to the interrogator antenna itself).

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 3A depicts a diagram of a side view of an embodiment of a plurality of tracking staples coupled together.

FIG. 3B depicts a diagram of a side view of an embodiment of a plurality of tracking nails coupled together.

FIG. 5 depicts a diagram of a front view of an embodiment of a wireless identification device separate from a tracking fastener.

FIG. 6 depicts a diagram of a side view of an embodiment of a wireless identification device separate from a tracking fastener.

FIG. 7 depicts a diagram of a top view of an embodiment of an opening in the proximal end of the tracking staples or tracking nails in which a wireless identification device is positioned.

Figure 1A:
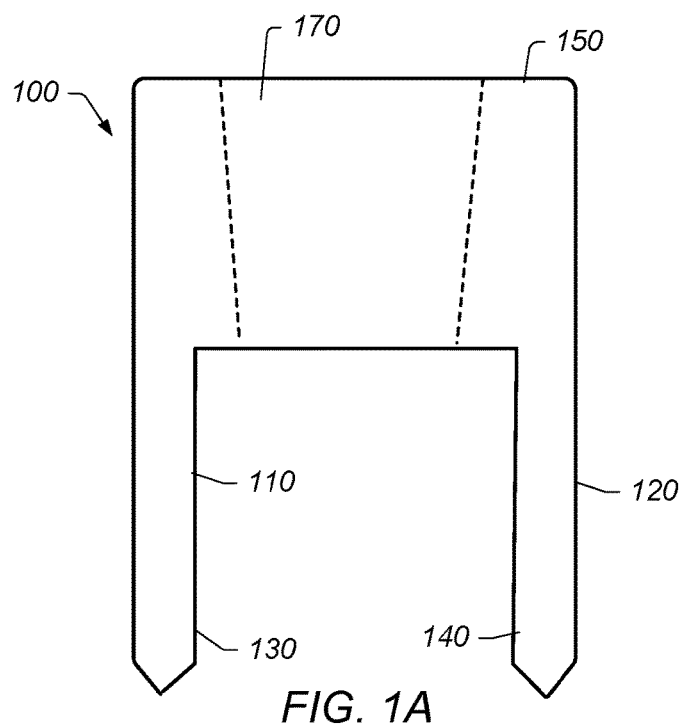
FIG. 1A depicts a diagram of a front view of an embodiment of a tracking staple.
Figure 1B:
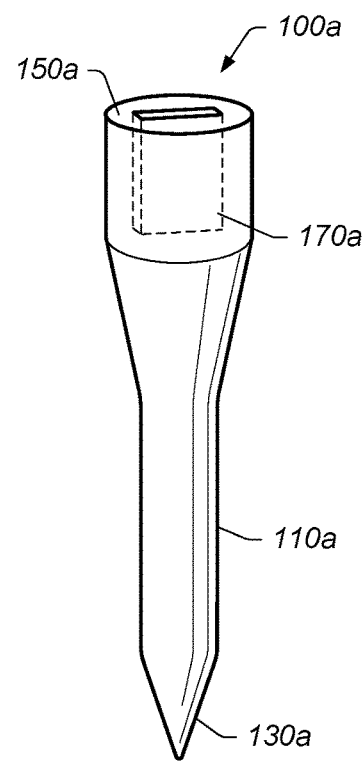
FIG. 1B depicts a diagram of a front view of an embodiment of a tracking nail.
Figure 2A:
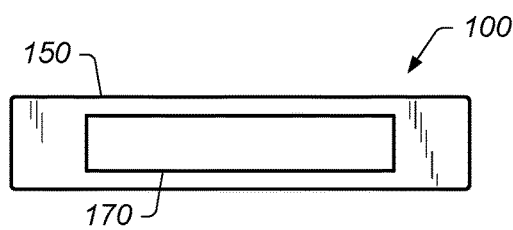
FIG. 2A depicts a diagram of a top view of an embodiment of a tracking staple without a wireless identification device.
Figure 2B:
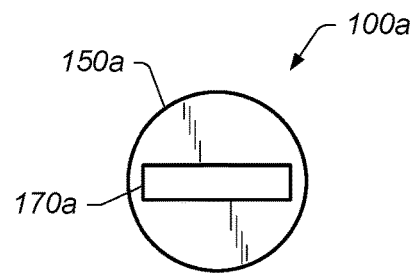
FIG. 2B depicts a diagram of a top view of an embodiment of a tracking nail without a wireless identification device.
Figure 4A:
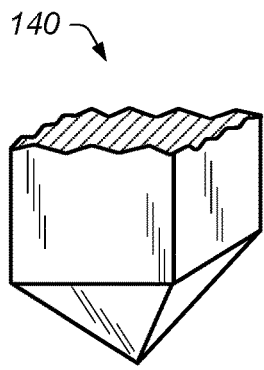
FIGS. 4A-H depict perspective views of several different embodiments of distal ends configured to facilitate penetration of a surface of an object.
Figure 4B:
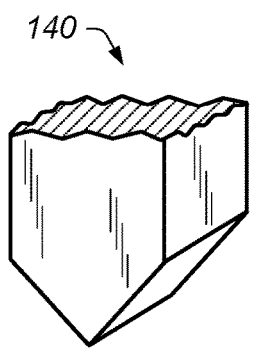
Figure 4C:
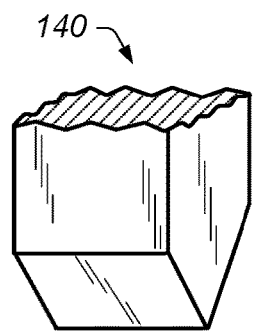
Figure 4D:
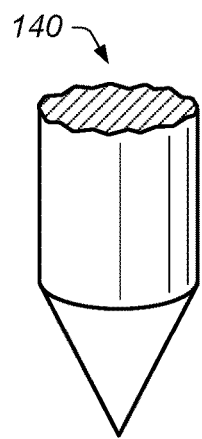
Figure 4E:
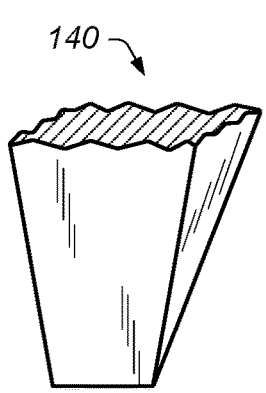
Figure 4F:
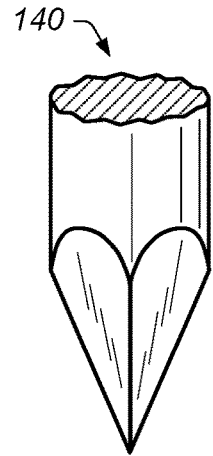
Figure 4G:
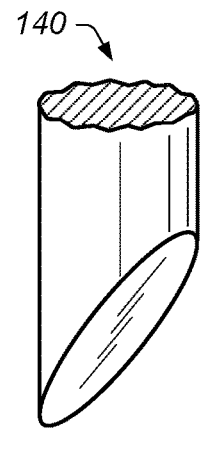
Figure 4H:
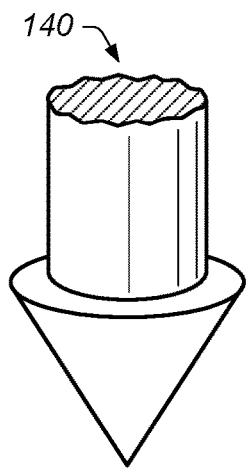

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process affects another process or structure without the involvement of an intermediate step or component.

The term "interrogator" (also known as "reader") as used herein generally refers to a radio transmitter and receiver that uses an interrogator antenna and may include a supplementary antenna for sending out a signal that triggers a transponder and for receiving and displaying the reply from the transponder. The interrogator sends data received from the transponder to a receiver (e.g., a server, a computer, etc. on which appropriate software may be run) for further processing.

The term "RFID" as used herein generally refers to radio-frequency identification and is the wireless use of electromagnetic fields to transfer data, for the purposes of automatically identifying and tracking tags attached to objects or items. The tags may contain electronically stored information such as, but not limited to, inventory details.

The term "tag" as used herein generally refers to a chip (e.g., a RFID chip) combined with an antenna and put together in some certain shape.

The term "UHF RFID" as used herein generally refers to ultra-high frequency radio-frequency identification and is generally the wireless use of electromagnetic fields to transfer data, for the purposes of automatically identifying and tracking tags attached to objects or items. The tags may contain electronically stored information relating to the objects or items.

The term "wireless identification device" as used herein generally refers to a chip itself (e.g., a RFID chip).

Embodiments

| Reference Numeral | General nonlimiting description |
|---|---|
| 100 | Tracking staple |
| 100a | Tracking nail |
| 110, 120 | Elongated members of staple |
| 110a | Elongated member of nail |
| 130, 140 | Distal ends of staple |
| 130a | Distal end of nail |
| 150 | Proximal end of staple |
| 150a | Proximal end of nail |
| 160 | Wireless identification device |
| 170 | Staple opening at proximal end |
| 170a | Nail opening at proximal end |
| 200 | Primary antenna |
| 210, 210a | Secondary antenna |
| 220, 230 | Protruding ends of antenna for staple |
| 220a, 230a | Protruding ends of antenna for nail |
| 240 | Interrogator |
| 250 | Supplementary antenna of interrogator |
| 300 | Pack of plastic tracking staple |
| 300a | Pack of plastic tracking nail |
| 400 | Cut logs |
| 410 | Truck carrying logs with tracking fastener inserted on the surface of log |
| 420 | Check points to read tracking fastener |
| 430 | Pallets |

In some embodiments, a tracking fastener may include a tracking staple or nail 100, 100a. FIGS. 1A-B and 2A-B depict diagrams of a front view and a top view respectively of an embodiment of a tracking staple and tracking nail. The tracking staple may include a first elongated member 110 and a second elongated member 120. The tracking nail may include an elongated member 110a. The elongated members of the tracking staple may include distal ends 130, 140. The elongated member of the tracking nail may include a distal end 130a. The distal end(s) of the tracking fastener may include a penetrating end(s). The distal end(s) may include a sharpened or pointed end as depicted in FIGS. 1A-B and 3A-B. Any number of different pointed or sharpened distal end embodiments may be used (e.g., a barb may be added to a distal end to increase holding power as needed). FIGS. 4A-H depict perspective views of several different embodiments of distal ends 130, 130a, 140 configured to facilitate penetration of a surface of an object. FIGS. 4A-H depict perspective views of different distal ends including: pyramid, chisel, chisel, cone, blunt, diamond, clinch, and barbed respectively.

The distal end in some embodiments may not include a sharpened or pointed end depending on the use, or the end diameter may be small enough that the distal end does not require an edge to penetrate a surface depending upon how much force is applied to the tracking fastener and the hardness of the surface to be penetrated. The distal end may penetrate, during insertion, a surface of an object. The distal end of tracking fastener may penetrate a surface of an object during insertion and be firmly held in place on the object to be tracked.

The elongated members 110, 110a and 120 may include a proximal end 150, 150a. The tracking fastener may include a wireless identification device 160 (e.g., as depicted in FIGS. 5-6). The wireless identification device may contain electronically stored information associated with an object to which the plastic tracking fastener is coupled. The plastic tracking fasteners may be coupled to the object by penetrating a surface of an object during insertion and firmly holding in place on the object to be tracked.

In some embodiments, the elongated member(s) 110, 110a, 120 and a portion of the proximal end 150, 150a may penetrate a surface during insertion such that at least part of the wireless identification device 160 penetrates the surface of an object.

In some embodiments, the body of the tracking fastener (e.g., not including antennae or wireless identification device) may be formed from a nonconductive material. Conductive materials may inhibit or interfere with the normal functioning of the wireless identification devices. The tracking fastener 100, 100a may be formed at least in part by a plastic or a polymer. In some embodiments, the plastic may include a thermoset material. In some embodiments, the plastic may include a thermoplastic material. In some embodiments, the plastic may include a thermoplastic and a thermoset material. A thermoplastic material may include a number of different polymers, including, but not limited to polyamide, polypropylene, polycarbonate, polyphenylene sulfide, polyetherimide, polyphthalamide, or polyamide-imide, or suitable biodegradable plastic materials. A thermoplastic material is a material that undergoes little permanent change on heating, it flows again on reheating and may be reformed into a new shape.

In some embodiments, tracking fasteners may resist, during insertion and prior to tracking, structural failure of the tracking fastener. In some embodiments, tracking fasteners may resist, during insertion and prior to tracking, breaking of the tracking fastener. In some embodiments, tracking fasteners may resist, after insertion, disengagement of the distal end(s) of the elongated member(s) from the surface. In some embodiments, tracking fasteners may include one or more tamper resistant features. Tamper resistant tracking fasteners may be constructed so that the tracking fastener is resistant from being removed in one piece (e.g., breaks apart upon removal (e.g., using frangible portions)) such that the tracking fastener may not be easily transferred from one item to another.

In some embodiments, the wireless identification device 160 may be at least partially positioned in the proximal end 150, 150a of the plastic tracking fastener 100, 100a. The wireless identification device 160, primary antenna 200, and secondary antenna 210, 210a may be at least partially positioned in an opening 170, 170a. The wireless identification device 160, primary antenna 200, and secondary antenna 210, 210a may be positioned in the opening 170, 170a such that the wireless identification device 160, primary antenna 200, and a portion of the secondary antenna 210, 210a is fully positioned in the opening.

In some embodiments, a composition (e.g., the polymer used to form the body of the tracking fastener) may be used to fill in the opening 170, 170a of the tracking fastener to inhibit components positioned in the opening from falling out. The composition may include a polymeric composition (e.g., an adhesive, an epoxy, etc.). In some embodiments, the wireless identification device, primary antenna, and secondary antenna may be directly positioned into a tracking fastener mold prior to forming the tracking fastener to reduce the number of manufacturing steps.

In some embodiments, the wireless identification device may include an RFID device. RFID may include the wireless use of electromagnetic fields to transfer data, for the purposes of automatically identifying and tracking tags attached to objects. The tags may contain electronically stored information. Some tags may be powered by electromagnetic induction (near field) from magnetic fields produced near the interrogator (reader). Some wireless identification tags may collect energy from the interrogating electromagnetic energy and act as a passive transponder. Other types have a local power source such as a battery and may operate at hundreds of meters from the interrogator (reader). Unlike a barcode, the tag does not necessarily need to be within line of sight of the interrogator (reader). RFID is one method which may be used for Automatic Identification and Data Capture (AIDC).

In some embodiments, the wireless identification device may include an UHF RFID device. Ultra-high frequency (UHF) is the ITU designation for radio frequencies in the range between 300 MHz and 3 GHz, also known as the decimeter band as the wavelengths range from one meter to one decimeter. Electromagnetic energy with frequencies above the UHF band fall into the SHF (super-high frequency) or microwave frequency range. Lower frequency signals fall into the VHF (very high frequency) or lower bands. UHF electromagnetic energy propagates mainly by line of sight; it is blocked by hills and large buildings although the transmission through building walls is high enough for indoor reception. It is used for television broadcasting, cell phones, satellite communication including GPS, personal radio services including Wi-Fi and Bluetooth, walkie-talkies, cordless phones, and numerous other applications. The IEEE defines the UHF radar band as frequencies between 300 MHz and 1 GHz. Two other IEEE radar bands overlap the ITU UHF band: the L band between 1 and 2 GHz and the S band between 2 and 4 GHz.

In an effort to prevent the passive "skimming" of RFID-enabled cards or passports, the U.S. General Services Administration (GSA) issued a set of test procedures for evaluating electromagnetically opaque sleeves. Shielding effectiveness depends on the frequency being used. Low-frequency identification (LowFID) tags, like those used in implantable devices for humans and pets, are relatively resistant to shielding though thick metal foil will prevent most reads. High frequency identification (HighFID) tags (13.56 MHz smart cards and access badges) are sensitive to shielding and are difficult to read when within a few centimeters of a metal surface. UHF identification (Ultra-High-FID) tags are difficult to read when placed within a few millimeters of a metal surface, although their read range is actually increased when they are spaced 2-4 cm from a metal surface due to positive reinforcement of the reflected wave and the incident wave at the tag. This demonstrates the need to form tracking fasteners which are used in combination with wireless identification tags from nonmetallic materials as discussed herein.

In some embodiments, the tracking fastener may include a primary antenna 200 at least partially positioned in the proximal end of the plastic tracking fastener. The primary antenna may be electrically coupled to the wireless identification device. In some embodiments, the primary antenna 200 may be formed as part of the wireless identification device (e.g., a portion of which is depicted in FIG. 5). The primary antenna may be electrically and mechanically coupled to the wireless identification device.

In some embodiments, the tracking fastener may include a secondary antenna 210, 210a at least partially positioned in the proximal end 150, 150a of the plastic tracking fastener 100, 100a. The secondary antenna 210, 210a may not be directly connected to the wireless identification device, but may have some coupling (e.g., electromagnetic) thereto, as well as coupling to the interrogator antenna. Coupling between the interrogator antenna and the wireless identification device through the secondary antenna may, either as a result of the secondary antenna being physically large or a portion of it positioned close to the wireless identification device, easily exceed direct coupling between the interrogator and the wireless identification device through the primary antenna alone. The secondary antenna may collect more energy from the interrogation field. The secondary antenna may be shaped or oriented to be responsive to more field directions and provide higher read range than is practicable for the primary antenna itself. The secondary antenna may be made conformable to any number of objects or items. The secondary antenna may provide enhanced coupling between an interrogator and a plurality of wireless identification devices which the interrogator interrogates either simultaneously or within a short space of time.

In some embodiments, the secondary antenna should have appropriate coupling to the primary antenna, so that a significant portion of the energy received by the secondary antenna may be transferred to the primary antenna of the wireless identification device. A portion of the reply generated by the wireless identification device may be transmitted via the primary and secondary antenna back to the interrogator. The interrogator may then transfer data to the computer for further processing.

Figure 8A:
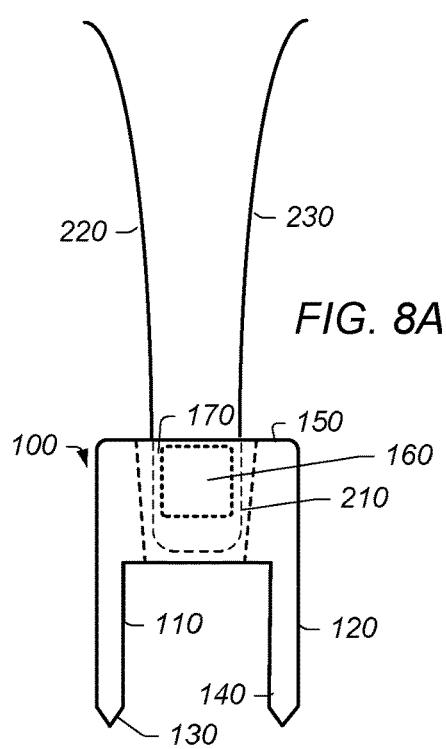
FIG. 8A depicts a diagram of a front view of an embodiment of a tracking staple including a dipole antenna.
Figure 8B:
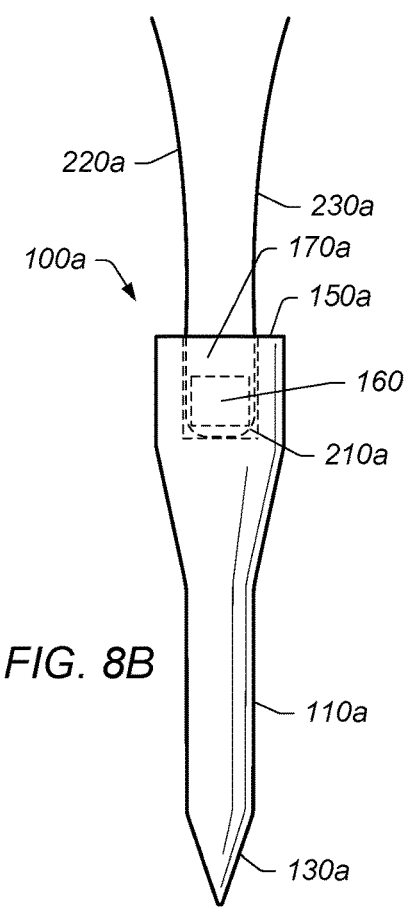
FIG. 8B depicts a diagram of a front view of an embodiment of a tracking nail including a dipole antenna.

In some embodiments, the secondary antenna may include a dipole antenna. The secondary antenna may be electromagnetically coupled to the primary antenna. In some embodiments, the secondary antenna comprises a length that is optimized for read range for a desired frequency or frequency range. At least a portion of the secondary antenna may be positioned in proximity to the primary antenna. The secondary antenna 210, 210a may include first 220, 220a and second 230, 230a ends extending out of the proximal end of the plastic tracking fastener (e.g., as depicted in FIGS. 7, 8A-B).

Figure 8C:
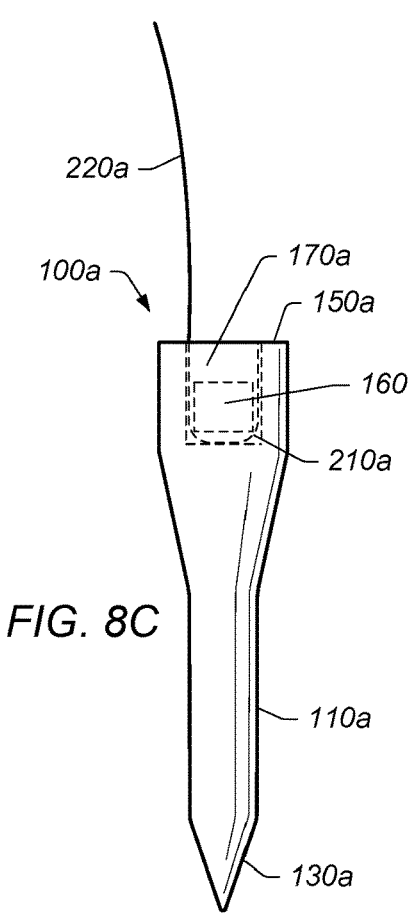
FIG. 8C depicts a diagram of a front view of an embodiment of a tracking nail including a monopole antenna.
Figure 8D:
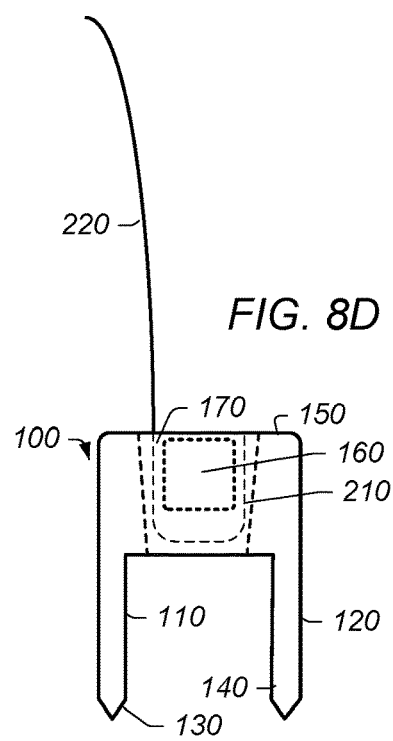
FIG. 8D depicts a diagram of a front view of an embodiment of a tracking staple including a monopole antenna.

In some embodiments, the secondary antenna may include a monopole antenna. The monopole antenna may be electromagnetically coupled to the primary antenna. In some embodiments, the secondary antenna comprises a length that is optimized for read range for a desired frequency or frequency range. At least a portion of the secondary antenna may be positioned in proximity to the primary antenna. The secondary antenna may include one end 220 or 220a (e.g., as depicted in FIGS. 8C-D) extending out of the proximal end of the plastic tracking fastener.

In some embodiments, at least a portion or all of the secondary antenna may be coated. The coating may include a thermoplastic covering over the antenna. The secondary antenna may need to be coated for insulation or for protection from the elements when used outdoors or in harsh environments. The coating may include a crosslinked polymer covering over the antenna. The coating may include a biodegradable polymer covering over the antenna. The crosslinked polymer or biodegradable polymer may be compatible with the pulping process.

Figure 10:
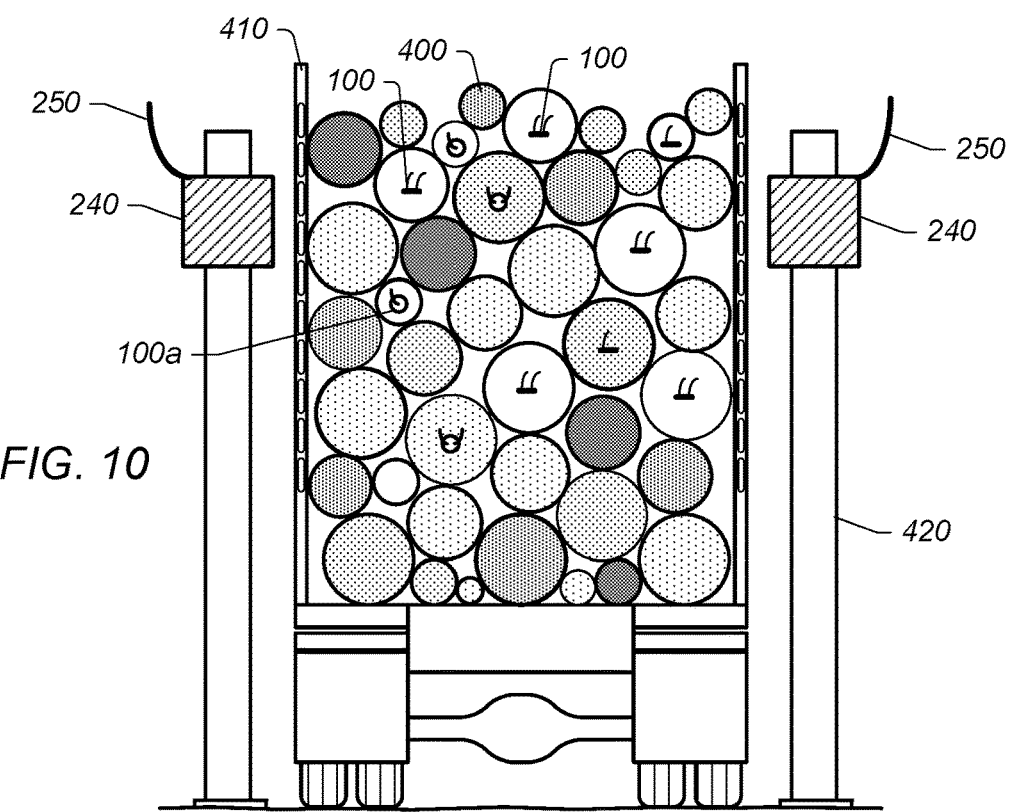
FIG. 10 depicts a diagram of a perspective view of an interrogator and an embodiment of tracking fasteners attached to a plurality of logs.

In some embodiments, the secondary antenna 210, 210a may be electromagnetically coupled, during use, to an interrogator 240 using a supplementary antenna 250 (e.g., as depicted in FIG. 10). The secondary antenna may enhance transfer of energy between the interrogator and the wireless identification device. The secondary antenna may enhance transfer of data between the interrogator and the wireless identification device.

In some embodiments, a system may include a supplementary antenna. The supplementary antenna may enhance transfer of electromagnetic energy between the interrogator and the wireless identification device. The supplementary antenna may function as an additional antenna for the interrogator with, for example, a higher gain (other than interrogator antenna itself).

In some embodiments, the coupling between the wireless identification device (enhanced by the secondary antenna) and the interrogator may be by electromagnetic radiation (i.e., no actual mechanical or direct electrical coupling) known as far-field UHF. Far-field UHF uses electromagnetic waves propagating between the wireless identification device (enhanced by the secondary antenna) and the interrogator. Using electromagnetic energy to communicate between the wireless identification device (enhanced by the secondary antenna) and the interrogator, UHF RFID may accommodate long-range application requirements. The UHF electric field is strong enough to extend much further than is possible with high-frequency options. UHF RFID is capable of communicating over several meters (e.g., with an operating frequency between about 860 and 960 MHz in the far-field). In some embodiments, the coupling between the wireless identification device (enhanced by the secondary antenna) and the interrogator may be by magnetic inductance in near-field UHF RFID. In some embodiments, the coupling between the wireless identification device (enhanced by the primary and or secondary antenna) and the interrogator may be provided by near field magnetic inductance (near field inductance may be provided by placing elements in close proximity).

In some embodiments, the coupling between the primary antenna and the secondary antenna may be enhanced by shaping the secondary antenna so that currents therein produce enhanced electromagnetic fields in the small region occupied by the primary antenna. In some embodiments, the secondary antenna can be made resonant at the operating frequency of the interrogation system (e.g., created by appropriate shaping of the secondary antenna to create an appropriate combination of inductance, capacitance and flux collecting area). In some embodiments, the secondary antenna may be shaped so that it is sensitive to field components which are in a different direction to those which directly excite the primary antenna. In some embodiments, the secondary antenna may be shaped to maximize its interaction with interrogators at a greater distance than the proposed primary antenna distance. Further discussions regarding transponder systems may be found in U.S. Pat. No. 6,172,608 to Cole which is incorporated by reference herein.

In some embodiments, the secondary antenna may be placed in close proximity to the primary antenna. The secondary antenna is electromagnetically coupled to the primary antenna of the wireless identification device. The secondary antenna may enhance transfer of electromagnetic energy from interrogator to the wireless identification device and may facilitate the transfer of the energy back from the wireless identification device to the interrogator at larger distance that otherwise may not be possible with the primary antenna alone.

Figure 9A:
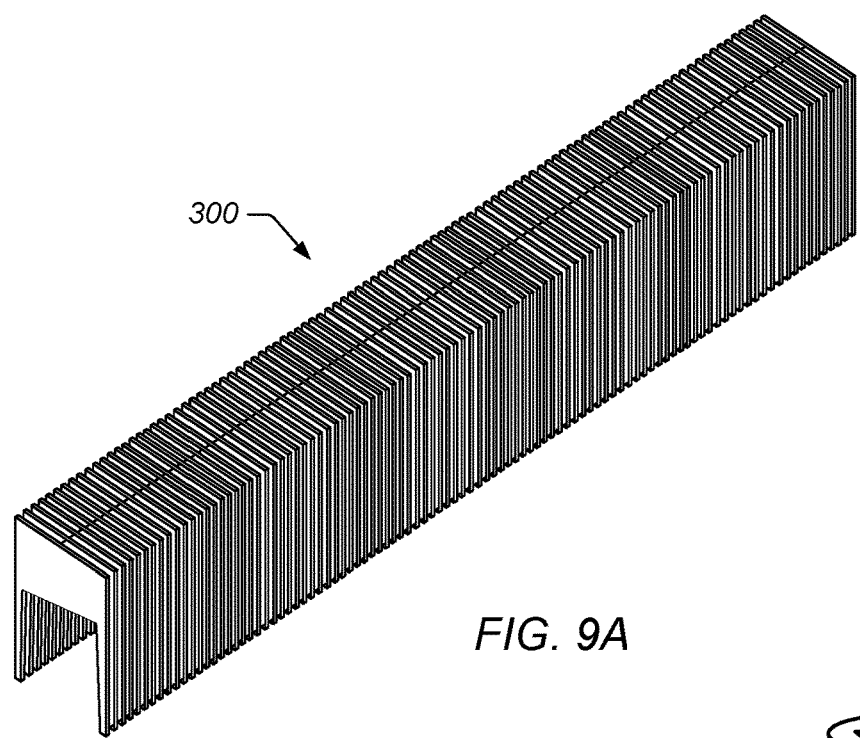
FIG. 9A depicts a diagram of a perspective view of an embodiment of a collated plurality of tracking staples to be inserted into a surface of an object using a staple insertion machine (antennae not depicted for clarity).
Figure 9B:
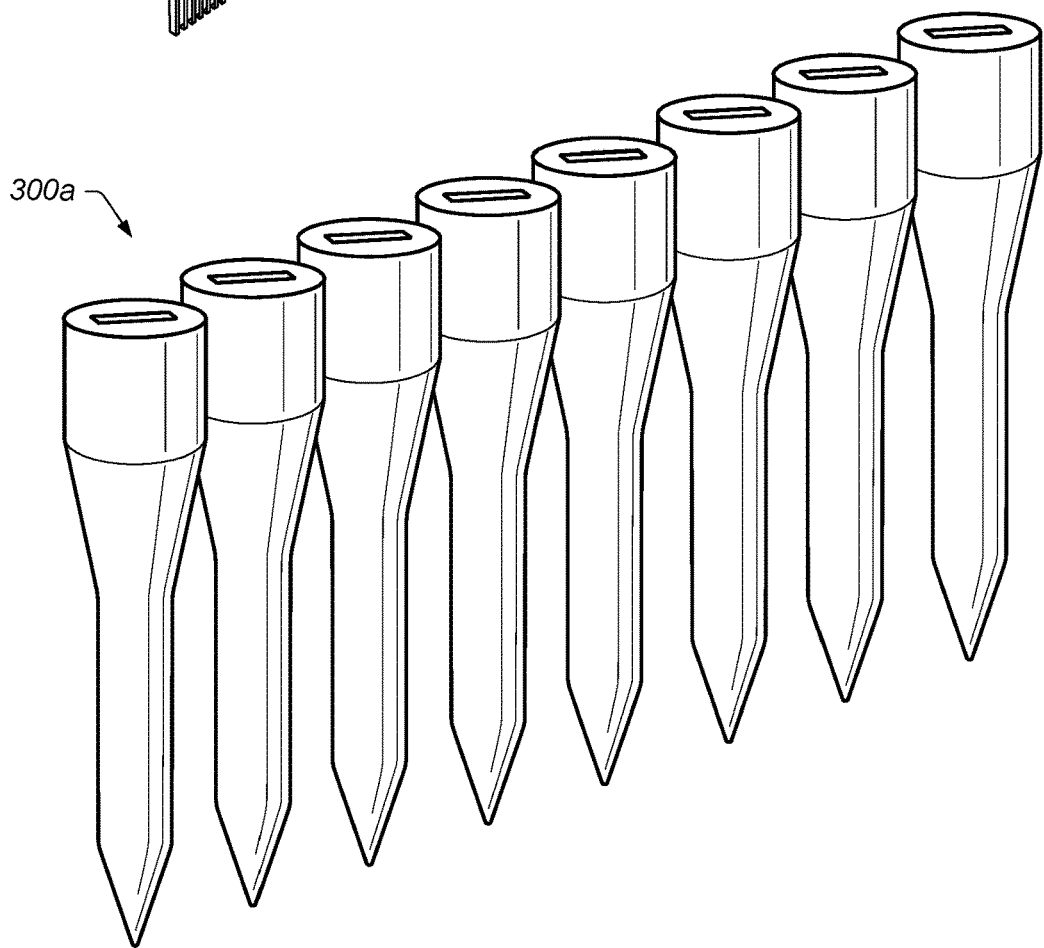
FIG. 9B depicts a diagram of a perspective view of an embodiment of a collated plurality of tracking nails to be inserted into a surface of an object using a nail insertion machine (antennae not depicted for clarity).

In some embodiments, the tracking fastener may be configured for insertion using a fastener insertion machine. In some embodiments, the tracking fastener may be inserted into the surface of an object singly, using a hammer or similar tool. In some embodiments, a tracking fastener is formed as part of plastic tracking fastener pack 300, 300a (e.g., as depicted in FIGS. 9A-B shown without secondary antenna for clarity) mountable in a fastener insertion machine. The tracking fastener pack may include a plurality of tracking fasteners of the invention joined in a strip, belt, clip or the like for sequential entry into a fastener insertion machine and subsequent penetration of materials such as wood, plaster board, plastics and the like. It is especially contemplated that the tracking fastener packs of the invention will be arranged end-to-end and fed one-by-one into a fastener insertion machine. The tracking fastener insertion machine may include automatic and manual insertion devices for tracking fasteners, including such devices as nailers, and staplers with hammers activated automatically, such as those having pneumatic, electric, shell or cartridge-activated hammers, or with hammers activated manually, such as spring-activated or momentum activated hammers.

The tracking fastener pack may require a specially designed nailers or staplers that are similar in function to industry standard nailers and staplers for metal fasteners. In some embodiments, the tracking fasteners may be drivable at least in a surface of a commodity wood substantially without deformation or breakage by the fastener insertion machine. The commodity wood may include pine, chip board, oak, maple, cedar, redwood or cherry or other manufactured wood product, harvested wood, or kiln dried solid wood.

Most applications that need RFID can use an adhesive tag or a tag that can be attached on a card like to clothing, but there are applications where a card tag or adhesive tag cannot stick or cannot be easily attached to the substrate. For example, lumber (for inventory control) and pallets (for freight) may be used with wireless identification tags, and there could be other applications where a tracking fastener can be inserted into the surface of an object and firmly held in place but a flat tag cannot stick. Common RFID tags will not stick onto rough lumber. Additionally, flat tags may not provide read range or read angles as long or wide as this invention.

In some embodiments, ultra-high frequency (UHF) may have a read range of over 10 feet. For example, when a log truck drives through a gate of a lumber mill, a brief pause or reduced speed will allow reading of tags on some or all logs on the truck from interrogators (readers) (e.g., fixed on either side of the gate). Without the longer read range, there is little to no advantage over either the bar codes, which are typically currently used in the industry, or over HF RFID tags currently available in plastic nail form. In some embodiments, the secondary antenna, electromagnetically coupled to the primary antenna, may enhance read range between the interrogator antenna and the wireless identification device.

In the logging industry wood is treated as a bulk raw material. Significant savings can be achieved by better inventory control and real time inventory information. Better overall control of the information and material flow helps to optimize the production efficiency. The key for implementing this control is the identification and tracking of the timber items (i.e., tree trunks, logs). Automated log identification in the wood supply chain helps to eliminate the need for multiple measurements and repeated inventories of timber stocks that are currently common. Traceability of timber also provides means to verify the chain of custody and the origin of the timber, and thus helps to prevent illegal loggings and to promote sustainable forestry practices. Verifying the chain of custody may advantageously lead to better inventory control, efficient transport and a reduction in timber losses, a significant problem in the logging industry.

In some embodiments, a method may include tracking an object using a tracking fastener. FIG. 10 depicts a diagram of an interrogator 240 and an embodiment of tracking fasteners 100, 100a attached to a plurality of logs 400. The method may include driving at least a portion of a plastic tracking fastener into a surface of an object (e.g., logs 400 loaded on truck 410). The method may include tracking the object using a wireless identification device 160 at least partially positioned in the proximal end of the plastic tracking fastener 100, 100a. The wireless identification device may contain electronically stored information associated with the single object or a set of objects to which the plastic tracking fastener is coupled. The electronic data may identify an object (e.g., a log) as regards, for example, origin, destination, quality, quantity, owner, price, or any other data known for a particular industry which is useful for tracking purposes.

In some embodiments, logs 400 may be tagged at their source where the logs are cut, using tracking fasteners 100, 100a. The tracking fasteners may be applied to the logs using a fastener insertion machine to improve speed and efficiency or may be applied singly using a hammer or similar tool. One or more logs of a single shipment may be tagged and tracked or in some embodiments all of the logs of a shipment may be tagged with tracking fasteners 100, 100a. Tracking fasteners 100, 100a/logs 400 may be tracked using interrogators 240 or a combination of supplementary antenna 250 and interrogator 240. Interrogators 240 may be hand held devices used by, for example, company employees or interrogators may be fixed at designated check points 420 (e.g., known or hidden (to inhibit theft)) along a route and/or at origin, checkpoints, and/or route checkpoints.

Figure 11:
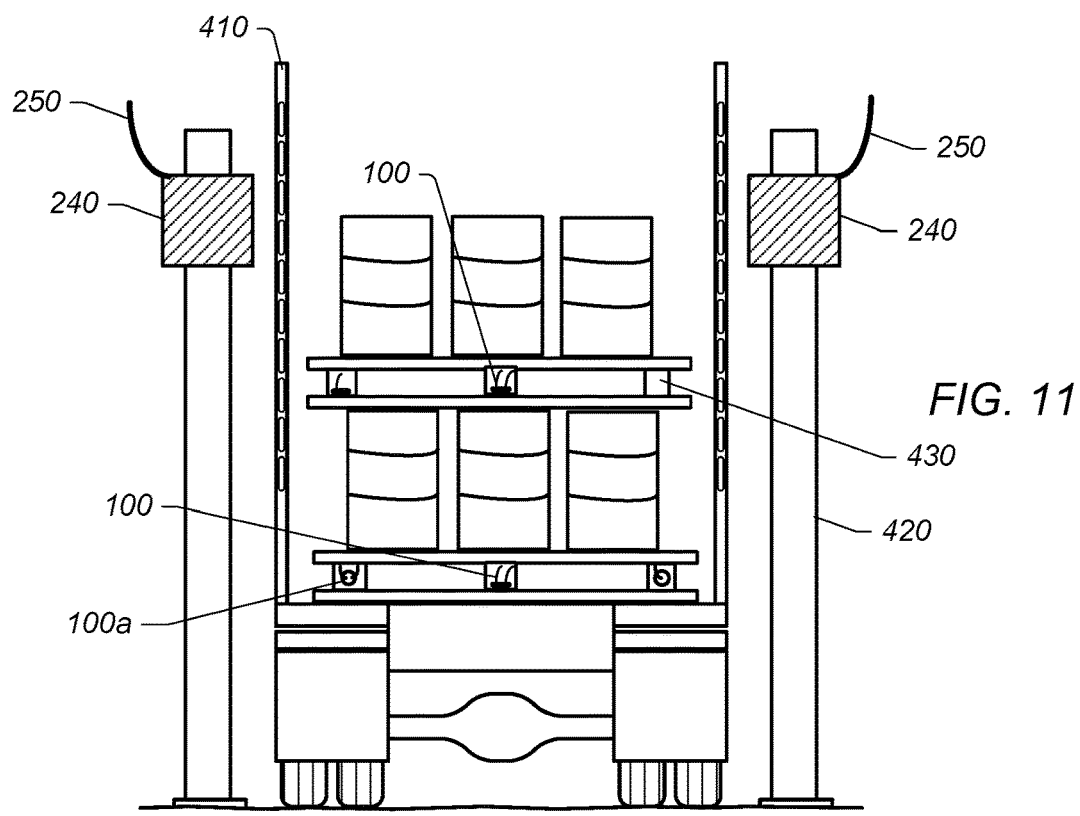
FIG. 11 depicts a diagram of a perspective view of an interrogator and an embodiment of tracking fasteners attached to a plurality of pallets.

In some embodiments, a method may include tracking an object using a tracking fastener. FIG. 11 depicts a diagram of an interrogator 240 and an embodiment of tracking fasteners 100, 100a attached to a plurality of pallets 430. The method may include driving at least a portion of a plastic tracking fastener into a surface of an object (e.g., pallets 430 loaded on truck 410). The method may include tracking the object using a wireless identification device 160 at least partially positioned in the proximal end of the plastic tracking fastener 100, 100*a*. The wireless identification device may contain electronically stored information associated with the object to which the plastic tracking fastener is coupled. The electronic data may identify an object (e.g., a pallet) as regards, for example, origin, destination, quality, quantity, owner, price, or any other data known for a particular industry which is useful for tracking purposes.

In some embodiments, pallets 430 may be tagged at their source (e.g. point of loading) using tracking fasteners 100, 100*a*. The tracking fasteners may be applied to the pallets using a fastener insertion machine to improve speed and efficiency or may be applied to the pallets singly using a hammer or similar tool. One or more pallets of a single shipment may be tagged and tracked or in some embodiments all of the pallets of a shipment may be tagged with tracking fasteners 100, 100*a*. Tracking fasteners 100, 100*a*/pallets 430 may be tracked using interrogators 240 or a combination of supplementary antenna 250 and interrogator 240. Interrogators 240 may be hand held devices used by, for example, company employees or interrogators may be fixed at designated check points 420 (e.g., known or hidden (to inhibit theft)) along a route and/or at origin, checkpoints, and/or route checkpoints.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A tracking fastener, comprising:
   a plastic tracking fastener, wherein the tracking fastener comprises at least one elongated member comprising at least one distal end which penetrates a surface of an object during insertion;
   a wireless identification device associated with the plastic tracking fastener, wherein the wireless identification device contains electronically stored information;
   a primary antenna at least partially positioned in a proximal end of the plastic tracking fastener, wherein the primary antenna is electrically coupled to the wireless identification device; and
   a secondary antenna at least partially positioned in the proximal end of the plastic tracking fastener, wherein the secondary antenna is electromagnetically coupled to the primary antenna, wherein the secondary antenna has at least one end extending out of the proximal end of the tracking fastener.

2. The tracking fastener of claim 1, wherein the at least one end provides a higher read angle and/or a higher read distance.

3. The tracking fastener of claim 1, wherein the secondary antenna is not electrically coupled to the primary antenna.

4. The tracking fastener of claim 1, wherein the secondary antenna comprises a dipole antenna or a monopole antenna.

5. The tracking fastener of claim 1, wherein the secondary antenna comprises a length that is optimized for read range for a desired frequency or frequency range.

6. The tracking fastener of claim 1, wherein the secondary antenna comprises a length ranging from between about $\frac{1}{8}^{th}$ to about one wavelength of a desired frequency.

7. The tracking fastener of claim 1, wherein the secondary antenna comprises a dipole antenna comprising a length ranging from between about $\frac{3}{4}^{th}$ to about $\frac{1}{2}$ wavelength of a desired frequency.

8. The tracking fastener of claim 1, wherein the secondary antenna comprises a monopole antenna comprising a length ranging from between about $\frac{3}{8}^{th}$ to about $\frac{1}{4}^{th}$ wavelength of a desired frequency.

9. The tracking fastener of claim 1, wherein at least a portion of the secondary antenna is positioned in proximity to the primary antenna, and wherein the secondary antenna comprises a dipole antenna with a first and a second end of the dipole antenna extending out of the proximal end of the plastic tracking fastener.

10. The tracking fastener of claim 1, wherein at least a portion of the secondary antenna is positioned in proximity to the primary antenna, and wherein the secondary antenna comprises a monopole antenna with one end of the monopole antenna extending out of the proximal end of the plastic tracking fastener.

11. The tracking fastener of claim 1, wherein the secondary antenna is electromagnetically coupled, during use, to an interrogator using an interrogator antenna and/or supplementary antenna, wherein the secondary antenna enhances transfer of energy between the interrogator and the wireless identification device.

12. The tracking fastener of claim 1, wherein at least one distal end of the elongated member(s) comprises an end(s) which penetrates a surface during insertion and is firmly held in place on the object to be tracked.

13. The tracking fastener of claim 1, wherein at least one distal end of the elongated member(s) comprises an end(s) which penetrates a surface of an object during insertion and is firmly held in place on the object to be tracked and is inhibited from being removed from the object without damage to the fastener.

14. The tracking fastener of claim 1, wherein the wireless identification device comprises a UHF RFID device.

15. The tracking fastener of claim 1, wherein the tracking fastener is a staple.

16. The tracking fastener of claim 1, wherein the tracking fastener is a nail.

17. The tracking fastener of claim 1, wherein the tracking fastener is configured for insertion into a surface of an object using a fastener insertion machine.

18. The tracking fastener of claim 1, wherein the secondary antenna comprises a coating.

19. The tracking fastener of claim 1, wherein the secondary antenna comprises a coating of thermoplastic material or crosslinked plastic material or a biodegradable material.

20. The tracking fastener of claim 1, wherein the secondary antenna contains a coating that is compatible with the pulping process.

21. The tracking fastener of claim 1, wherein a read range/distance using industry standard interrogators transmitting at some frequency between 860 to 960 MHz is at least 7 feet.

22. The tracking fastener of claim 1, wherein a read range/distance using industry standard interrogators transmitting at some frequency between 860 to 960 MHz is at least 10 feet.

23. The tracking fastener of claim 1, wherein the electronically stored information is associated with an object to which the plastic tracking fastener is coupled.

24. A log comprising a tracking fastener, wherein the tracking fastener comprises:
   a plastic tracking fastener, wherein the tracking fastener comprises at least one elongated member comprising at least one distal end which penetrates a surface of an object during insertion;
   a wireless identification device at least partially positioned in a proximal end of the plastic tracking fastener, wherein the wireless identification device contains electronically stored information associated with the log to which the plastic tracking fastener is coupled;
   a primary antenna at least partially positioned in the proximal end of the plastic tracking fastener, wherein the primary antenna is electrically coupled to the wireless identification device; and
   a secondary antenna at least partially positioned in the proximal end of the plastic tracking fastener, wherein the secondary antenna is electromagnetically coupled to the primary antenna.

25. The tracking fastener of the log of claim 24, wherein the secondary antenna has at least one end extending out of the proximal end of the tracking fastener.

26. The tracking fastener of the log of claim 24, wherein the secondary antenna comprises a dipole antenna or a monopole antenna.

27. The tracking fastener of the log of claim 24, wherein the secondary antenna comprises a length ranging from between about $1/5^{th}$ to about one wavelength of a desired frequency.

28. The tracking fastener of the log of claim 24, wherein at least a portion of the secondary antenna is positioned in proximity to the primary antenna, and wherein the secondary antenna comprises a dipole antenna with a first and a second end of the dipole antenna extending out of the proximal end of the plastic tracking fastener.

29. The tracking fastener of the log of claim 24, wherein at least one distal end of the elongated member(s) comprises an end(s) which penetrates a surface of an object during insertion and is firmly held in place on the object to be tracked and is inhibited from being removed from the object without damage to the fastener.

30. The tracking fastener of the log of claim 24, wherein the tracking fastener is a staple.

31. The tracking fastener of the log of claim 24, wherein the tracking fastener is a nail.

32. The tracking fastener of the log of claim 24, wherein the secondary antenna comprises a coating of thermoplastic material or crosslinked plastic material or a biodegradable material.

33. The tracking fastener of the log of claim 24, wherein the secondary antenna contains a coating that is compatible with the pulping process.

34. A pallet comprising a tracking fastener, wherein the tracking fastener comprises:
   a plastic tracking fastener, wherein the tracking fastener comprises at least one elongated member comprising at least one distal end which penetrates a surface of an object during insertion;
   a wireless identification device at least partially positioned in the proximal end of the plastic tracking fastener, wherein the wireless identification device contains electronically stored information associated with the pallet or an object associated with the pallet to which the plastic tracking fastener is coupled;
   a primary antenna at least partially positioned in the proximal end of the plastic tracking fastener, wherein the primary antenna is electrically coupled to the wireless identification device; and
   a secondary antenna at least partially positioned in the proximal end of the plastic tracking fastener, wherein the secondary antenna is electromagnetically coupled to the primary antenna.

35. The tracking fastener of the pallet of claim 34, wherein the secondary antenna has at least one end extending out of the proximal end of the tracking fastener.

36. The tracking fastener of the pallet of claim 34, wherein the secondary antenna comprises a dipole antenna or a monopole antenna.

37. The tracking fastener of the pallet of claim 34, wherein the secondary antenna comprises a length ranging from between about $1/5^{th}$ to about one wavelength of a desired frequency.

38. The tracking fastener of the pallet of claim 34, wherein at least a portion of the secondary antenna is positioned in proximity to the primary antenna, and wherein the secondary antenna comprises a dipole antenna with a first and a second end of the dipole antenna extending out of the proximal end of the plastic tracking fastener.

39. The tracking fastener of the pallet of claim 34, wherein at least one distal end of the elongated member(s) comprises an end(s) which penetrates a surface of an object during insertion and is firmly held in place on the object to be tracked and is inhibited from being removed from the object without damage to the fastener.

40. The tracking fastener of the pallet of claim 34, wherein the tracking fastener is a staple.

41. The tracking fastener of the pallet of claim 34, wherein the tracking fastener is a nail.

42. The tracking fastener of the pallet of claim 34, wherein the secondary antenna comprises a coating of thermoplastic material or crosslinked plastic material or a biodegradable material.

43. The tracking fastener of the pallet of claim 34, wherein the secondary antenna contains a coating that is compatible with the pulping process.

* * * * *